(12) United States Patent
Lee

(10) Patent No.: US 9,835,075 B2
(45) Date of Patent: Dec. 5, 2017

(54) EXHAUST GAS DISCHARGE INDUCING APPARATUS FOR VEHICLE

(71) Applicant: Bum Hyung Lee, Seoul (KR)

(72) Inventor: Bum Hyung Lee, Seoul (KR)

( * ) Notice: Subject to any disclaimer, the term of this patent is extended or adjusted under 35 U.S.C. 154(b) by 0 days.

(21) Appl. No.: 15/314,526

(22) PCT Filed: Aug. 25, 2016

(86) PCT No.: PCT/KR2016/009407
§ 371 (c)(1),
(2) Date: Nov. 29, 2016

(87) PCT Pub. No.: WO2017/039222
PCT Pub. Date: Mar. 9, 2017

(65) Prior Publication Data
US 2017/0198623 A1 Jul. 13, 2017

(30) Foreign Application Priority Data
Sep. 4, 2015 (KR) .................. 10-2015-0125269

(51) Int. Cl.
*B60K 13/04* (2006.01)
*F01N 13/08* (2010.01)

(52) U.S. Cl.
CPC ............ *F01N 13/082* (2013.01); *B60K 13/04* (2013.01); *F01N 2260/06* (2013.01); *F01N 2270/08* (2013.01); *F01N 2610/085* (2013.01)

(58) Field of Classification Search
CPC .... F01N 13/08; F01N 13/082; F01N 2260/06; F01N 2270/08; F01N 2610/08; F01N 2610/085; B60K 13/04

USPC ......................................................... 180/309
See application file for complete search history.

(56) References Cited

U.S. PATENT DOCUMENTS

| 5,282,361 A * | 2/1994 | Sung ...................... F01N 13/082 60/315 |
| 7,461,506 B2 * | 12/2008 | McNally ................... F01N 3/02 138/112 |
| 7,628,012 B2 * | 12/2009 | Eifert .................... F01N 13/082 60/319 |
| 9,206,729 B2 * | 12/2015 | Mungas ................ F01N 13/082 |

(Continued)

FOREIGN PATENT DOCUMENTS

| JP | 1993-256140 A | 10/1993 | ............. F02B 27/04 |
| KR | 10-1993-0016641 | 8/1993 | ............. F01N 7/20 |
| KR | 20-1998-0024310 U | 7/1998 | ............. F01N 7/08 |

(Continued)

Primary Examiner — John D Walters
(74) Attorney, Agent, or Firm — Kusner & Jaffe

(57) ABSTRACT

An exhaust gas discharge inducing apparatus installed at the end of an exhaust pipe of a vehicle. The exhaust gas discharge apparatus includes: two or more driving wind intake sets installed at a lower part of a vehicle to collect a driving wind generated during running of a vehicle and guiding the collected driving wind into an induction cover of the discharge inducing device mounted onto the end portion of an exhaust pipe through a driving wind passage pipe; and a discharge inducing device includes an exhaust gas passage pipe, a driving wind connection passage, and an induction cover. The exhaust gas passage pipe is connected to the exhaust pipe, and includes a plurality of exhaust gas outlets disposed at the end portion thereof.

16 Claims, 14 Drawing Sheets

(56) References Cited

U.S. PATENT DOCUMENTS

2005/0205355 A1* 9/2005 Lin .................. F01N 1/088
                                                                          181/279

FOREIGN PATENT DOCUMENTS

| KR | 20-0237019 Y1 | 6/2001 | ............... F01N 7/08 |
| KR | 10-2008-0071839 A | 8/2008 | ............... F01N 7/20 |
| KR | 10-2010-0039278 A | 4/2010 | ............... F01N 3/18 |

* cited by examiner

EXHAUST GAS DISCHARGE INDUCING APPARATUS FOR VEHICLE

FIELD OF THE INVENTION

The present invention relates to an exhaust gas discharge inducing apparatus installed at the end of an exhaust pipe of a vehicle, and more particularly, to an exhaust gas discharge inducing apparatus for a vehicle, which promotes a discharge of an exhaust gas generated in an engine by inhibiting an occurrence of a swirl in an exhaust gas discharged from the exhaust pipe to the outside while lowering a pressure around an end portion of the exhaust pipe from which an exhaust gas is discharged.

BACKGROUND OF THE INVENTION

Generally, when exhaust gases generated in vehicle engines are discharged to the outside air, noise and vibration are caused, and environmental pollution is caused. Accordingly, a catalytic converter and a muffler are installed at an exhaust passage of a vehicle, and thus occurrence of noise and vibration is minimized while blocking the discharge of environmental pollutants. At the same time, exhaust gases need to be smoothly discharged from the exhaust pipe at the end of the muffler to the outside air.

However, as shown in FIG. 2, an exhaust manifold, a catalytic converter (3) for purifying an exhaust gas, and a muffler (4) are installed on a passage from the combustion chamber of an engine (2) to the end of an exhaust pipe (9), and a flow resistance significantly acts on the discharge of an exhaust gas due to the passage (9) that has a long length. Thus, the discharge (9a) is delayed by many interferences and flow resistance while exhaust gases are passing the exhaust pipe (9), and thus the output of the vehicle engine and the fuel efficiency are reduced.

In order to over this limitation, Korean Patent Application Publication No. 10-1993-0016641 discloses an exhaust promoting apparatus on internal combustion engine. The exhaust promoting apparatus includes a diffusion pipe (1) having a trumpet shape that gradually increases in cross-section toward the end of an exhaust pipe of a vehicle, and a fluid guide member (3) disposed at an opening of the end of the exhaust pipe and gradually decreasing in cross-section in a form of surrounding the exhaust pipe. Also, a tapered induction body (2) that is narrowed in forward and backward directions is fixed at the end of the exhaust pipe by a support piece (11), and thus the outflow of exhaust gas of the exhaust pipe is promoted by air that is increased in flow velocity by the fluid guide member (30).

The exhaust promoting apparatus disclosed in Korean Patent Application Publication No. 10-1993-0016641 promotes the discharge of exhaust gas using air accelerated by the fluid guide member (3) of air. However, since a passage formed with the fluid guide member (3) is very narrow due to the diffusion pipe of the end of the exhaust pipe, accelerated air is not smoothly discharged, and thus the flow velocity of air at the end of the exhaust pipe is rapidly lowered, thereby interrupting a smooth discharge of exhaust gas.

In addition, an exhaust gas discharged from the exhaust pipe is lowered in pressure at a point where the fluid guide member (3) meets the end of the exhaust pipe and thus the discharge of exhaust gas is further induced, but in this process, the exhaust pressure of exhaust gas is reduced by a flat wall surface of the tapered induction body (2), and the discharge of exhaust gas is rather delayed.

Above all, since the point where air accelerated through the fluid guide member (3) and the end portion of exhaust gas meet each other is limited to one point, an efficiency of suctioning an exhaust gas discharged from the exhaust pipe at the end portion of the fluid guide member where the pressure is low compared to the end of the exhaust pipe is lowered.

Accordingly, a method that can discharge a larger amount of exhaust gas per unit time from the exhaust pipe using the flow velocity of external air is urgently needed.

SUMMARY OF THE INVENTION

Technical Problem

The present invention provides an exhaust gas discharge inducing apparatus for a vehicle, which can improve the discharge efficiency of an exhaust gas by maintaining a peripheral pressure field of an exhaust gas at a uniformly low state and discharging an exhaust gas to a low pressure field through a plurality of locations.

The present invention also provides an exhaust gas discharge inducing apparatus for a vehicle, which can maximize the discharge efficiency of an exhaust gas while minimizing an occurrence of a swirl in the flow of an exhaust gas that is discharged out of an exhaust gas passage pipe, by disposing a plurality of exhaust gas outlets in a second induction region in which a cross-section between the exhaust gas passage pipe and an induction cover and thus allowing an exhaust gas flowing in the exhaust gas passage pipe to be discharged without a resistance through a flow passage formed by a guide plate.

The present invention also provides an exhaust gas discharge inducing apparatus for a vehicle, which can maximize the discharge amount of an exhaust gas per unit time, by allowing an exhaust gas to be mixed with a large amount of low-pressure driving wind at a plurality of locations while being not interrupted by a resistance due to a guide plate that is curvedly formed when a large amount of driving wind around an exhaust gas discharged from an exhaust pipe is induced at a high speed and thus plentifully discharging an exhaust gas without an occurrence of a swirl.

The present invention also provides an exhaust gas discharge inducing apparatus for a vehicle, which can improve the driving output and fuel efficiency by promoting the discharge of an exhaust gas generated in a combustion chamber of a vehicle engine.

Technical Solution

In one general aspect, a discharge inducing device includes: an exhaust gas passage pipe communicating with an exhaust pipe to allow an exhaust gas to pass therethrough, including a plurality of exhaust gas outlets formed at different locations in an axial direction and penetrating an outer circumferential surface of the exhaust gas passage pipe at a first section, allowing an protrusion part not to be formed in the outer circumferential surface where the exhaust gas outlet is formed, and discharging an exhaust gas through the exhaust gas outlet; and an induction cover including a first induction region surrounding the exhaust gas passage pipe to form a driving wind flow passage in which a driving wind induced in accordance with running of a vehicle between the exhaust gas passage pipe and the induction cover flows and accelerating a driving wind while gradually decreasing in cross-section along the flow direction of a driving wind, and a second induction region extending to an end thereof while maintaining a uniform cross-section and surrounding the exhaust gas outlet to promote a discharge of an exhaust gas from the exhaust gas passage pipe through the exhaust gas outlet.

When an air flow accelerated in the first induction region of the induction cover In accordance with the forward movement of a vehicle passes through a first section of the exhaust gas passage pipe, an exhaust gas flowing through the exhaust gas passage pipe may be induced to consistently flow to the outside of the radius of the exhaust gas passage pipe through a plurality of outlets disposed throughout a long length of the first section along an axial direction. Thus, a typical limitation in that a discharge of an exhaust gas is reduced as a point at which an accelerated air flow and an exhaust gas meet each other is limited to one point can be overcome. Also, the discharge of an exhaust gas generated in the combustion chamber of a vehicle engine can be more surely promoted through the plurality of outlets disposed along the axial direction.

In other words, when an exhaust gas discharge inducing device configured as described above is installed at the end of the exhaust pipe of a vehicle, the air flow may be accelerated through the first induction region that gradually decreases in diameter toward the end of the exhaust gas passage pipe according to the running of a vehicle. Also, while accelerated air passes the plurality of outlets distributed along the axial direction in the second induction region (corresponding to the first section), a lower pressure may be induced over the first section around the exhaust gas passage pipe, and thus an exhaust gas may be suctioned and discharged from the plurality of outlets disposed in the first section, thereby promoting the discharge of an exhaust gas from the exhaust pipe across a wide region.

Thus, despite the flow resistance due to a long path from the combustion chamber of a vehicle, since an exhaust gas is more smoothly discharged from the vehicle combustion chamber to the outside air, the output of the engine may be improved, thereby improving the driving performance and the fuel efficiency.

The discharge inducing device may further include an exhaust passage pipe end (132) blocking the exhaust gas passage pipe (122) while protruding at the center thereof against the flow direction of an exhaust gas flowing in the exhaust gas passage pipe (122).

The exhaust passage pipe end may protrude in a sharp shape.

The discharge inducing device may further include a guide plate (127) guiding all exhaust gases flowing in the exhaust gas passage pipe (122) such that an exhaust gas discharged at a location adjacent to the center of the exhaust gas passage pipe (122) is allowed to discharged through an exhaust gas outlet adjacent to an end of the exhaust passage pipe end (132) and an exhaust gas discharged at a location far away from the center of the exhaust gas passage pipe (122) in a radial direction is allowed to discharged through an exhaust gas outlet far away from the end of the exhaust passage pipe end (132).

Guide flow passages (S1, S2, S3 and S4) guided by the guide plates may be formed to have a uniform cross-section from the inlet to the outlet, respectively, and thus exhaust gases of different regions may be dividedly guided to different outlets by the guide plates. Accordingly, an occurrence of a swirl may be inhibited in the process of discharging an exhaust gas through the outlet from the exhaust gas passage pipe. Also, the flow resistance can be minimized, and the discharge of exhaust gas can be promoted.

The guide flow passages guided by the guide plates are formed to have a gradually increasing cross-section from the inlet to the outlet, respectively, and the sectional area of the outlet is larger than the sectional area of the inlet and smaller than about 120% of the sectional area of the inlet.

The guide plate may include an inclination part inclining with respect to the axial direction of the exhaust gas passage pipe, and thus at least a portion of exhaust gas discharged through the plurality of outlets may be guided by the guide plate. Accordingly, an exhaust gas flowing in the connection pipe may be guided and discharged by the guide plate while an occurrence of a swirl inside the exhaust gas passage pipe is maximally inhibited, thereby lowering the flow resistance of exhaust gas and thus improving the discharge efficiency.

In the second induction region, the cross-section between the exhaust gas passage pipe and the induction cover may be uniformly maintained, and thus in a region surrounding the exhaust gas passage pipe, an air flow field of a fast flow velocity may be consistently and continuously discharged to the outside without being interrupted by the exhaust gas passage pipe or the induction cover. Accordingly, an exhaust gas flowing in the connection pipe may be suctioned by a lower pressure field formed at the circumference thereof to be consistently and plentifully discharged, and thus the discharge efficiency may be improved.

Accordingly, the first section may be disposed within second induction region to minimize a swirl and reduce the flow resistance.

The exhaust gas passage may be formed into a ring shape, and may be disposed in plurality while being spaced from each other along an axial direction. Thus, an exhaust gas may be discharged from the exhaust gas passage pipe through the outlets in various directions.

The exhaust gas outlet may be formed in three or more at different locations of an axial direction over the first section, and may have a ring shape.

The exhaust gas passage pipe may be the exhaust pipe, or may be coupled to the exhaust pipe.

The exhaust gas outlet may include an induction plate parallel to the exhaust gas passage pipe and extending toward the end of the exhaust gas passage pipe, to induce an exhaust gas flowing out of the exhaust gas passage pipe through the exhaust gas outlet to have a directional component parallel to the exhaust gas passage pipe.

The sectional area of the exhaust gas passage pipe (122) may be about 1.0 to 1.5 times of the sectional area of a mixture gas outlet (125) of the second induction region. Thus, a space between the exhaust gas passage pipe (122) and the induction cover (121), to which an exhaust gas is discharged, may maintain a substantially uniform cross-section until an exhaust gas reaches the mixture gas outlet (125) and is discharged, and thus the outflow flow rate per unit time at the mixture gas outlet 125 and the passing flow rate per unit time at the inside of the exhaust gas passage pipe (122) are maintained similar to each other. Accordingly, an exhaust gas can be continuously and consistently discharged while the flow resistance and swirl are minimized.

In one general aspect, an exhaust gas discharge inducing apparatus installed at an exhaust pipe of a vehicle include: a discharge inducing device (120) according to any one of claims 1 to 13; and two or more driving wind intake sets (110) installed at a lower part of a vehicle to collect a driving wind generated during running of a vehicle and guiding the collected driving wind into an induction cover (121) of the discharge inducing device (120) mounted onto the end portion of an exhaust pipe through a driving wind passage pipe (114).

Thus, the air flow under the vehicle body during the running of a vehicle may be collected by the driving wind intake set, and the flow of a driving wind may be collected into the first induction region, thereby inducing the flow of a large amount of driving wind to flow at a high speed in the second induction region, the cross-section of which gradually decreases. Accordingly, an exhaust gas flowing through the exhaust pipe connection member may be discharged through the plurality of exhaust gas outlets in the second induction region, thereby inducing a large amount of exhaust gas by a high-speed driving wind and thus increasing the discharge efficiency.

Simultaneously, as the plurality of exhaust gas outlets are formed in the exhaust pipe connection member, an exhaust gas may be more easily discharged out of the exhaust pipe connection member through the plurality of exhaust gas outlets from the second induction region in which a large amount of driving wind flows. Accordingly, the discharge efficiency of an exhaust gas can be significantly improved.

In other words, when an exhaust gas discharge inducing device configured as described above is installed at the end of the exhaust pipe of a vehicle, a large amount of driving wind may be accelerated through the first induction region that gradually decreases in diameter toward the end of the exhaust pipe connection member according to the running of a vehicle. Also, while accelerated air passes the plurality of exhaust gas outlets distributed along the axial direction in the second induction region, a lower pressure may be induced around the exhaust pipe connection member, and thus an exhaust gas may be suctioned and discharged from the plurality of exhaust gas outlets, thereby promoting the discharge of an exhaust gas from the exhaust pipe connection member across a wide region.

Thus, despite the flow resistance due to a long path from the combustion chamber of a vehicle, since an exhaust gas is more smoothly discharged from the vehicle combustion chamber to the outside air, the output of the engine may be improved, thereby improving the driving performance and the fuel efficiency.

Here, the driving wind intake set may include the collection part disposed at the end portion of the driving wind passage pipe and having a wider cross-section than the cross-section of the driving wind passage pipe, and thus can supply much more driving wind to the discharge inducing device.

Also, the filter having a mesh shape may be provided at the inlet of the collection part to block the inflow of foreign substances, and thus can prevent foreign substances such as fallen leaves and pebbles on a road from being suctioned during the running of a vehicle.

The collection part may be installed in plurality in a direction parallel to the ground, and thus may collect much driving wind while being configured not to collide with protrusions such as speed bumps on a road during the running of a vehicle.

Also, a driving wind guide may be installed at the front side of the driving wind intake set under a vehicle. The driving wind guide may include a pair of plates which are spread toward the front side to collect much more driving wind and supply the collected driving wind to the discharge inducing device. Thus, the discharge efficiency can be increased.

Also, a blocking plate may be disposed at one side of the induction cover, and the exhaust pipe connection member and the driving wind connection passage may penetrate the blocking plate to be connected to the inside of the induction cover. Thus, during the running of a vehicle, foreign substances such as fallen leave and pebbles may be secondarily prevented from being introduced into the induction cover.

Also, the plurality of exhaust gas outlets may be formed into a ring shape across the second induction region, and may be spaced from each other along the flow direction, thereby increasing the discharge efficiency of exhaust gas.

Also, an induction plate may extend at the exhaust gas outlet toward a rear side, and may be parallel to the exhaust pipe connection member. Thus, an exhaust gas discharged through the exhaust gas outlet may be induced to flow in a direction parallel to an exhaust gas flowing to the mixture gas outlet, thereby improving the discharge efficiency of exhaust gas.

Also, the sectional area (region indicated as di) of the exhaust pipe connection member may be configured to be about 1.0 to about 1.5 times larger than the sectional area (difference between region indicated as do and region indicated as di) of the mixture gas outlet of the second induction region, thereby maximizing the discharge efficiency of exhaust gas.

Also, the end of the exhaust passage pipe end may be configured to extend by a certain length parallelly to the exhaust pipe connection member at a location to which the exhaust pipe connection member extends, thereby inducing a smooth discharge of exhaust gas.

Also, an air pump may be disposed between the muffler and the outlet. The air pump may be operated by an electric motor to suction an exhaust gas and discharge an exhaust gas to the outside. Thus, even though a vehicle is traffic jammed or runs at a low speed and thus it is difficult to obtain a high-speed driving wind, the air pump can forcibly discharge an exhaust gas, thereby improving the exhaust efficiency of an engine and the fuel efficiency.

In this case, the air pump may be controlled by a controller that is turned on/off in accordance with the driving speed of a vehicle, and thus, when a vehicle can induce a sufficiently fast flow of a driving wind, the air pump may not operate unnecessarily.

Since the terms "including", "comprising", and "having" can be construed as encompassing corresponding components unless specially described as opposite, it should be understood that they do not exclude other components but encompass other components. Unless defined otherwise, all technical and scientific terms have the same meanings as commonly understood by those skilled in the art to which the present invention belongs.

Also, the term 'driving wind' set forth herein may be defined as an air flow generated during the running of a vehicle, and the term 'exhaust gas' set forth herein and terms similar thereto may be defined as indicating a combustion gas generated in a vehicle engine. In addition, the term 'mixture gas' set forth herein may be defined as a gas that is finally discharged by mixture of a driving wind and an exhaust gas.

Furthermore, the term 'front side' set forth herein may be defined as indicating a traveling direction of a vehicle, and the term 'rear side' set forth herein may be defined as indicating a direction opposite thereto.

Other features and aspects will be apparent from the following detailed description, the drawings, and the claims.

Advantageous Effects

According to embodiments of the present invention configured as described above, the discharge efficiency of an exhaust gas can be maximized, and thus the fuel efficiency can be increased, by lowering a flow pressure of a driving wind at the end portion of the exhaust pipe using a driving wind generated during the running of a vehicle, and by forming much more amount of driving wind around an exhaust pipe connection member at which an exhaust gas flows.

Also, a driving wind accelerated in a first induction region may maintain a uniform flow cross-section while passing a second induction region in which a plurality of exhaust gas outlets are formed, and thus the driving wind of the second induction region may flow at a uniform speed. Accordingly, an exhaust gas can be uniformly discharged through the exhaust gas outlets while an occurrence of a swirl is inhibited, and thus the discharge efficiency can be improved.

First of all, the present invention can maximize the discharge amount of an exhaust gas per unit time, by allowing an exhaust gas to be mixed with a large amount of low-pressure driving wind at a plurality of locations while being not interrupted by a resistance due to a guide plate that is curvedly formed when a large amount of driving wind around an exhaust gas discharged from an exhaust pipe is induced at a high speed and inhibiting an occurrence of a swirl at a plurality of points.

That is, the present invention can minimize the flow resistance and the occurrence of a swirl by allowing all of exhaust gases discharged from the exhaust pipe to be mixed with a driving wind without a resistance such as a swirl and to be discharged, and by dividedly guiding exhaust gases of different regions to different exhaust gas outlets using the guide plate. Also, since the internal sectional area of the exhaust gas passage pipe extends to the exhaust gas outlet without a change, exhaust gases may be wholly discharged at one time without a blockage, and thus may be continuously discharged to the mixture gas outlet, thereby maximizing the discharge efficiency.

In addition, when it is difficult to generate a driving wind due to traffic jam or low-speed driving of a vehicle, an air pump installed at the exhaust pipe may be operated to forcibly discharge an exhaust gas. Thus, the discharge of an exhaust gas can be smoothly performed regardless of the driving speed of a vehicle, and thus the fuel efficiency can be increased.

Thus, the present invention can improve the driving output and fuel efficiency by promoting the discharge of an exhaust gas generated in a combustion chamber of a vehicle engine.

DETAILED DESCRIPTION OF THE INVENTION

Figure 1:
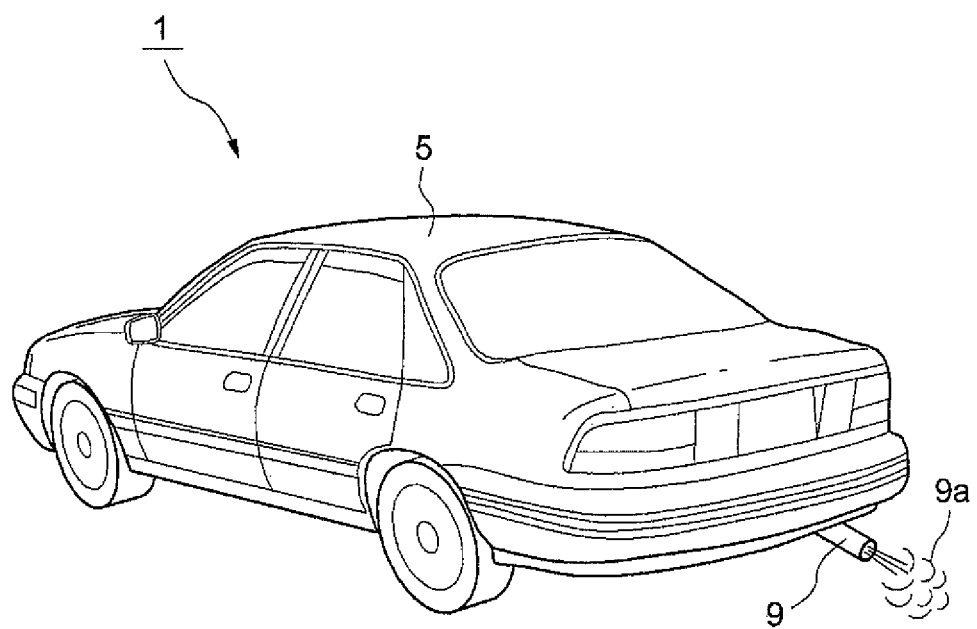
FIG. 1 is a perspective view illustrating an exhaust pipe of a typical vehicle.
Figure 2:
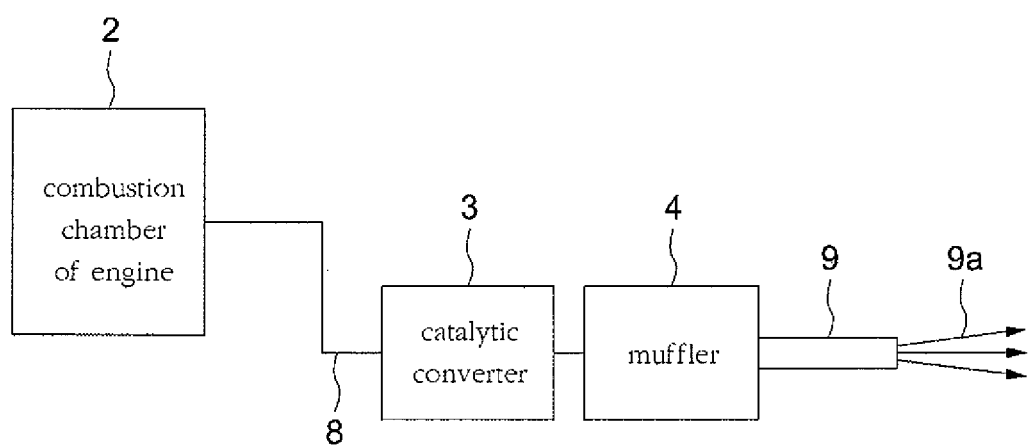
FIG. 2 is a schematic view illustrating a passage through which exhaust gas is discharged from an engine combustion chamber.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Hereinafter, an exhaust gas discharge inducing apparatus 100 for a vehicle according to an embodiment of the present invention will be described in detail with reference to the accompanying drawings. However, for explanation of the present invention, detailed descriptions of well-known functions or configurations will be omitted in order to clarify the essential points of the present invention.

Figure 3:
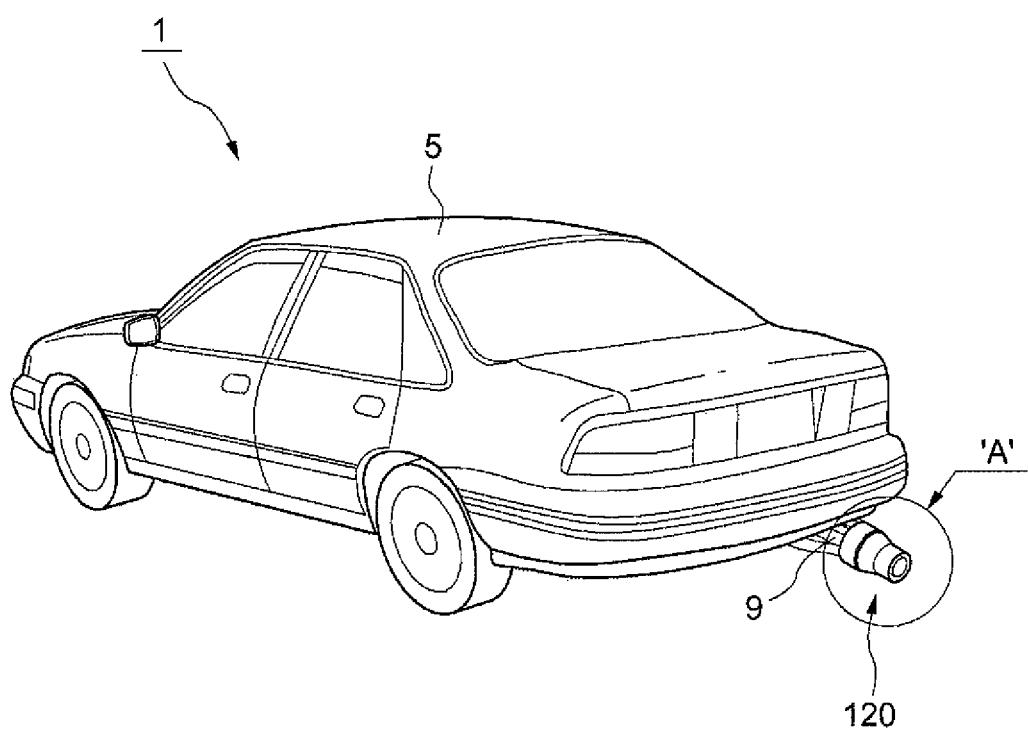
FIG. 3 is a perspective view illustrating an exterior of a vehicle equipped with an exhaust gas discharge inducing apparatus for a vehicle according to an embodiment of the present invention.
Figure 4:
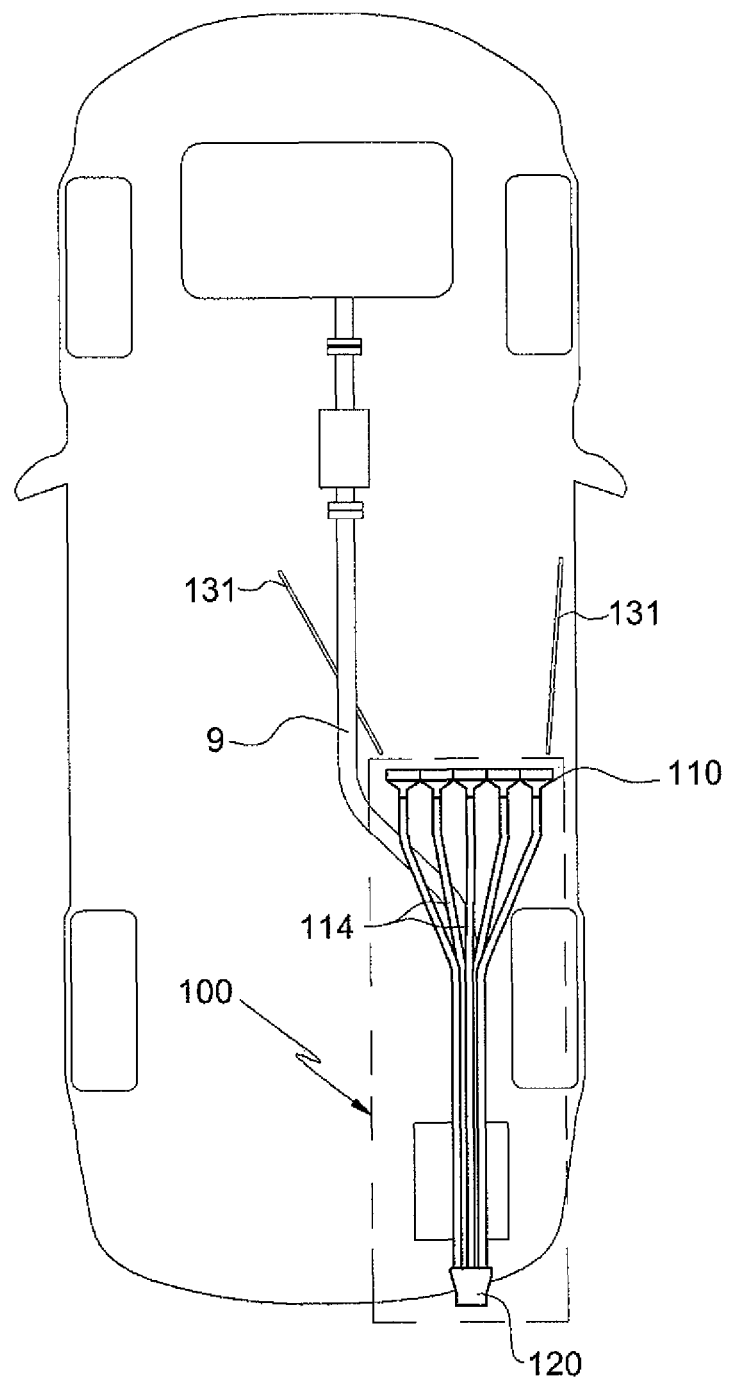
FIG. 4 is a view illustrating a lower part of a vehicle equipped with an exhaust gas discharge inducing apparatus for a vehicle according to an embodiment of the present invention.
Figure 5:
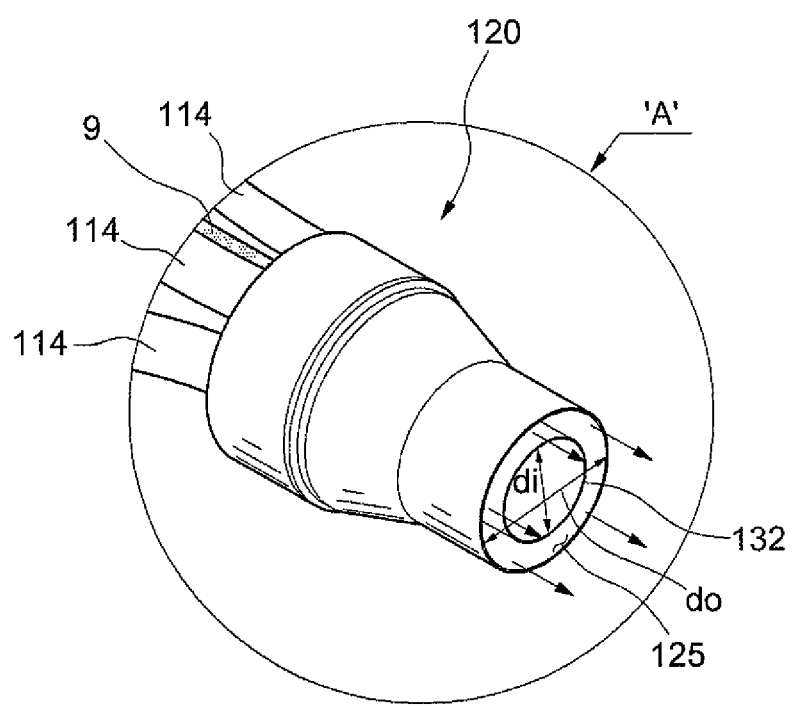
FIG. 5 is a magnified view illustrating a portion 'A' of FIG. 3.

As shown in FIGS. 3 and 4, an exhaust gas discharge inducing apparatus 100 may include a discharge inducing device 120 and a driving wind intake set 110. The discharge inducing device 120 may be disposed at an end portion of an exhaust pipe 9 that discharges exhaust gas of a vehicle. The driving wind intake set 110 may suction a driving wind generated during driving, and may supply the driving wind to the discharge inducing device 120 through a driving wind passage pipe 114.

Figure 6:
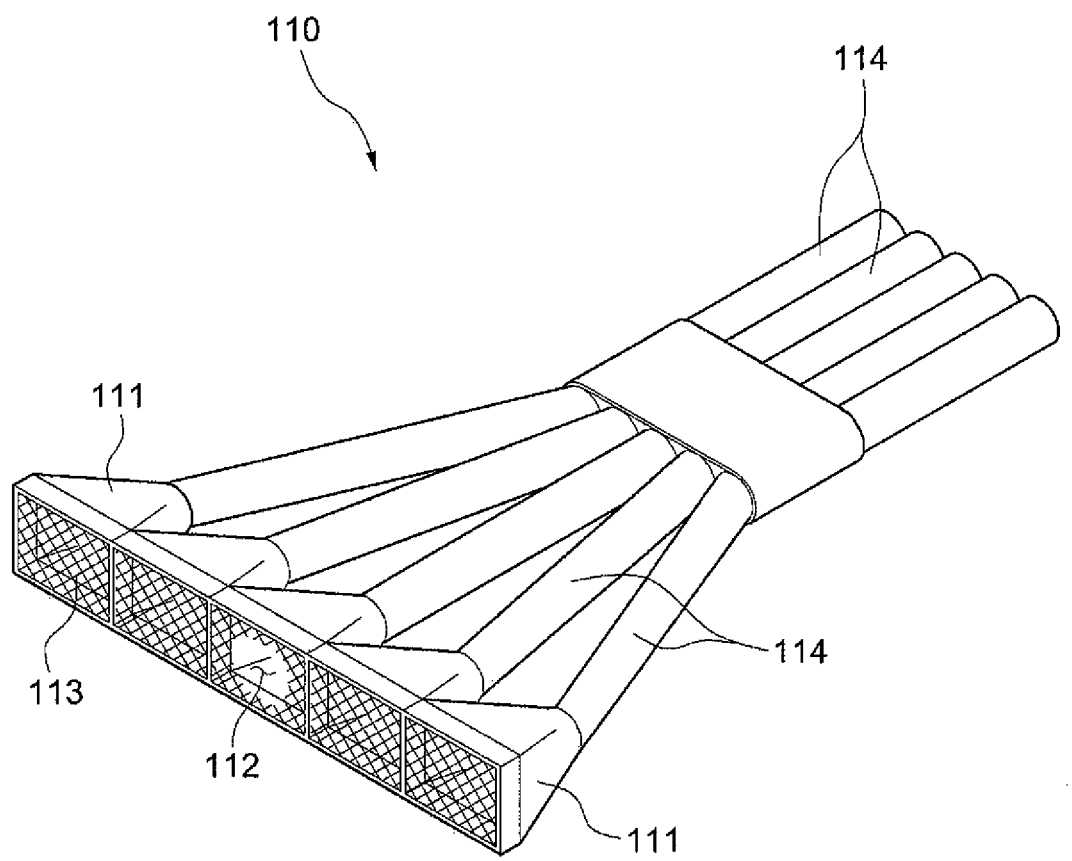
FIG. 6 is a perspective view illustrating a driving wind intake set mounted onto a lower part of a vehicle.

As shown in FIG. 6, the driving wind intake set 110 may include a collection part 111 suctioning a driving wind over a wide region, and a driving wind passage pipe 114 supplying the driving wind suctioned by the collection part 111 to the discharge inducing device 120.

Here, the driving wind passage pipe 114 may be an inflexible metal pipe or a flexible pipe for simple connection with the discharge inducing device 120. In the drawings, a plurality of driving wind passage pipes 114 are shown as collecting a driving wind. However, according to another embodiment, a type of hood in which a collection part and a filter are provided to collect a driving wind and the driving wind passage pipe 114 is integrated into one may also be provided in accordance with the structure of the lower part of a vehicle. Thus, since a driving wind is generated around a vehicle by a relative motion when a vehicle runs, the collection part 111 may be arranged to face forward in a traveling direction of a vehicle, and thus may collect much more driving wind.

In this drawing, the driving wind passage pipe 114, an exhaust gas passage pipe 122, and an induction cover 121 may be all formed into a pipe shape of a circular section, but may also be formed into a shape of an oval or rectangular section in accordance with the structure of the lower part of a vehicle.

Since various devices such as oil plates, suspension, catalytic converter, muffler, and transmission are installed at the lower part of a vehicle, a driving wind passing through the lower part of a vehicle may be a form of swirl. Accordingly, in order not to hinder collection of a driving wind even though a swirl occurs in the driving wind under a vehicle, the driving wind intake set 110 may be installed in a horizontal form to collect a driving wind as shown in FIG. 6. When the driving wind intake set 110 is horizontally disposed, a swirling driving wind may be much more collected. Also, since the downwardly protruding length of a vehicle is smaller, a probability that the lower part of a vehicle is scratched by protrusions such as speed bumps may be reduced.

Figure 13:
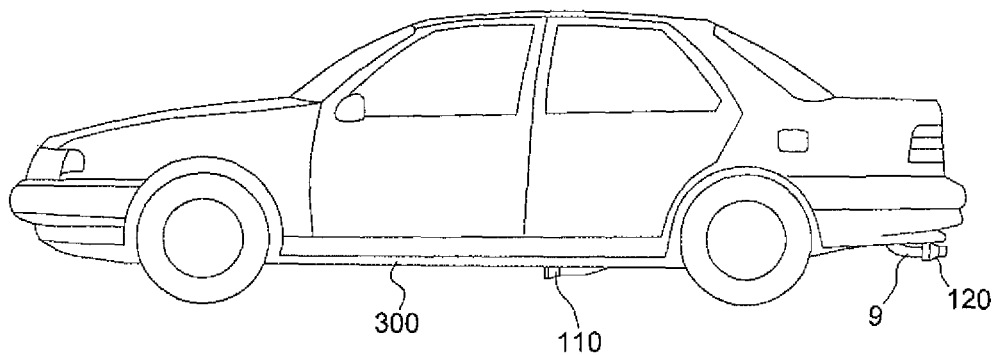
FIG. 13 is a view illustrating an installation state of a driving wind intake set of a vehicle equipped with a cover.

Meanwhile, since various devices such as engine housing, power transmission shaft and muffler are installed at the lower part of a vehicle, the lower part of a vehicle may be uneven. Accordingly, a swirl may occur in the driving wind generated under a vehicle body when a vehicle runs. When a swirl may occur in a driving wind, the air volume of the driving wind introduced through the driving wind intake set 110. Accordingly, as shown in FIG. 13, an undercover 300 may be installed at the lower part of a vehicle to flatten the lower surface of a vehicle. Thus, an occurrence of a swirl in the driving wind generated under a vehicle during the running can be minimized.

That is, the undercover 300 that is flat may be installed onto the lower body of a vehicle, and as shown in FIG. 13, the driving wind intake set 110 may be installed onto the undercover. Thus, since a swirl does not occur in a driving wind flowing under a vehicle body, the driving wind may be induced to be more smoothly suctioned.

Also, as shown in FIGS. 4 and 6, a driving wind guide 131 may be disposed at a front side of the driving wind intake set 110 under a vehicle. The driving wind guide 131 may have a plate shape. Here, the driving wind guide 131 may be disposed in pair, and an interval between the driving wind guides 131 at a front side of a vehicle may be greater than an interval between the driving wind guides 131 at a location where the driving wind guides 131 are connected to the driving wind intake set 110. Thus, in addition to a driving wind around a region where the collection part 111 is disposed, a driving wind guided by the driving wind guide 131 may be further collected and suctioned. In this case, the height of the driving wind guide 131 may be equal to or slightly larger than the height of the collection part 111 of the driving wind intake set 110.

In the embodiment of FIG. 6, the collection part 111 of the driving wind intake set 110 may be horizontally disposed in plurality, but a portion of the collection parts 111 may also be longitudinally disposed to extend to the front face of a vehicle.

Also, a mesh type of filter 113 may be disposed at an inlet 112 of the collection part 111. The filter 113 may prevent foreign substances such as fallen leaves and pebbles from being introduced into the inlet 112 during the running of a vehicle. When a driving wind generated under the under-surface of a running vehicle is suctioned by the driving wind intake set 110 configured as above, the suctioned driving wind may be supplied to the discharge inducing device 120 through the driving wind passage pipe 114.

Figure 7:
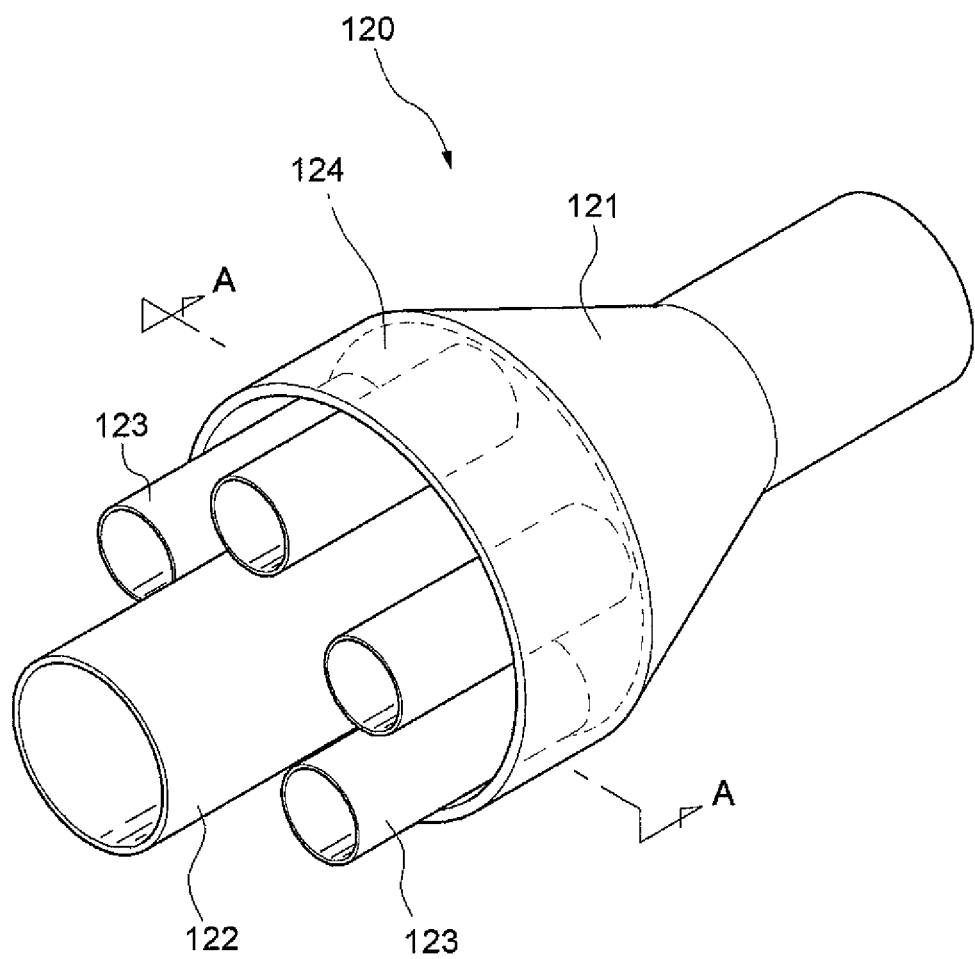
FIG. 7 is a perspective view illustrating a discharge inducing device coupled to an exhaust pipe of a vehicle.
Figure 8:
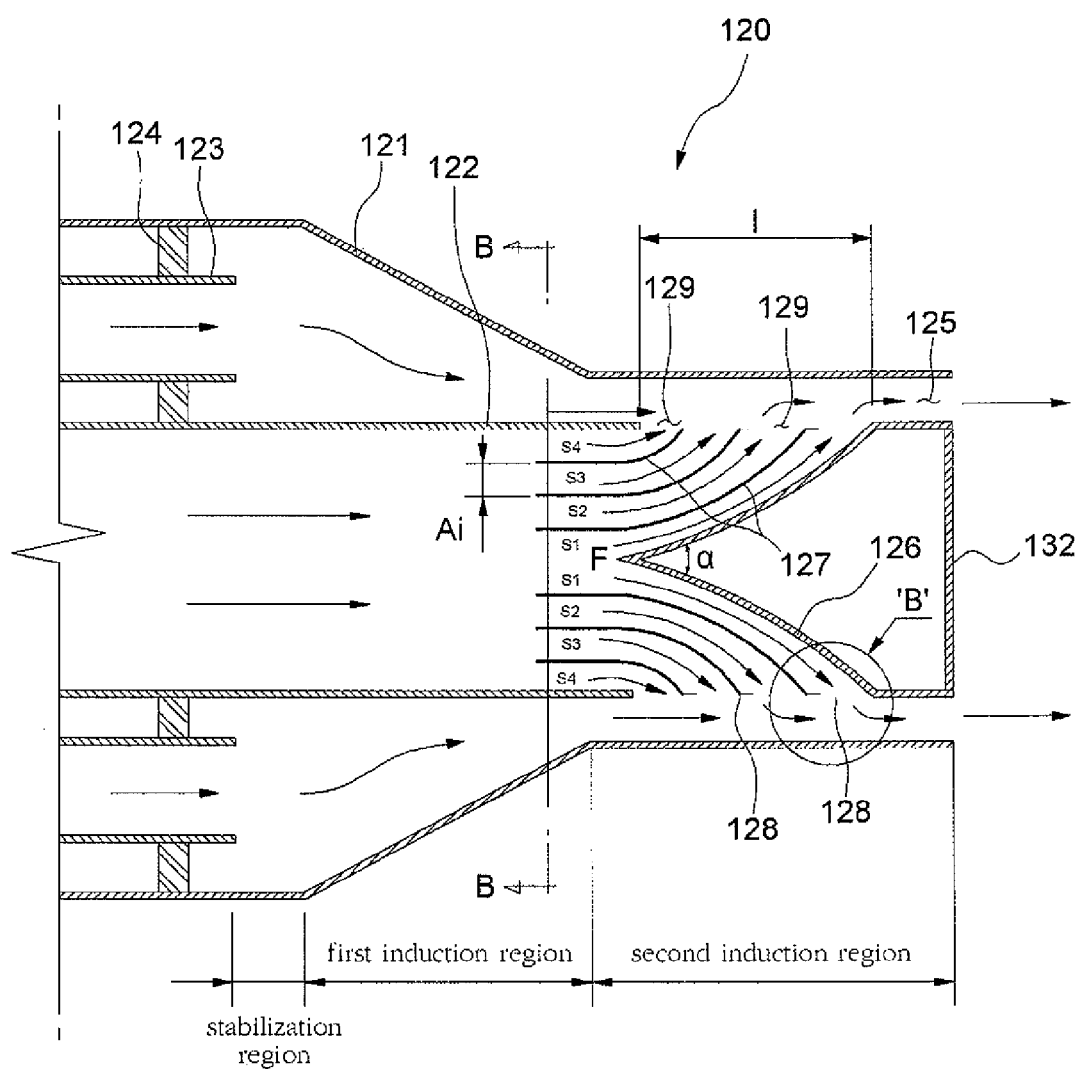
FIG. 8 is a cross-sectional view illustrating a sectional structure of a discharge inducing device coupled to an exhaust pipe of a vehicle.

As shown in FIGS. 7 and 8, the discharge inducing device 120 may include an exhaust gas passage pipe 122, a driving wind connection passage 123, and an induction cover 121. The exhaust gas passage pipe 122 may be connected to the exhaust pipe 9 to discharge an exhaust gas, and include a plurality of exhaust gas outlets 129 disposed at the end portion thereof. The plurality of exhaust gas outlets 129 may be spaced from each other along a longitudinal direction in the exhaust gas passage pipe 122. The driving wind connection passage 123 may be connected to the driving wind passage pipe 114. The induction cover 121 may be disposed to cover the end of the driving wind connection passages 123 and the exhaust gas passage pipe 122, and may include a first induction region becoming narrower in inner diameter toward the end thereof and a second induction region surrounding the exhaust gas outlets 129 and extending to the end thereof while maintaining the same inner diameter.

In the drawings, the exhaust gas passage pipe 122 is shown as being connected to the exhaust pipe 9, but the exhaust gas passage pipe 122 may be formed integrally with the exhaust pipe 9. That is the exhaust gas passage pipe 122 may also be a portion of the exhaust pipe 9.

As shown in FIG. 7, the induction cover 121 may have a smaller inner diameter at a rear side (closer to the outlet) thereof than at a front side thereof. The exhaust gas passage pipe 122 may have a section so as to be coupled with the vehicle exhaust pipe 9 at the center of the induction cover 121. Also, the driving wind passage pipes 114 may be radially disposed outside the exhaust gas passage pipe 122, and may be insertedly connect to the driving wind connection passage 123.

That is, as shown in FIG. 8, the exhaust gas passage pipe 122 and the driving wind connection passage 123 may penetrate a blocking plate 124 to communicate with an internal space surrounded by the induction cover 121. The blocking plate 124 may form a sealed space that is blocked from the outside air toward the front side of a vehicle. The flow of driving wind may be stabilized in a stabilization region of the sealed space, and then may be accelerated in the first induction region.

Thus, since the blocking plate 124 is disposed between the exhaust gas passage pipe 122 and the driving wind connection passage 123, foreign substances such as fallen leaves, pebbles, and soils may be prevented from being introduced into the internal space of the induction cover 121 through spaces between the exhaust gas passage pipe 122 and the driving wind connection passage 123 and between the driving wind connection passage 123 and the driving wind connection passage 123.

The induction cover 121 surrounding the end of the driving wind connection passage 123 may include a stabilization region, a first induction region, and a second induction region. The stabilization region may be formed to surround the exhaust gas passage pipe 122, may form a driving wind flow passage in which a driving wind induced between the exhaust gas passage pipe 122 and the induction cover 121 by the running of a vehicle flows, and may extend from the outlet of the driving wind connection passage 123 in a uniform inner diameter. The first induction region may accelerate the driving wind while gradually decreasing in sectional area along the flow direction of the driving wind. The second induction region may surround the exhaust gas outlets 129, and may extend to the end while having a uniform sectional area. The second induction region may promote the discharge of an exhaust gas from the exhaust gas passage pipe 122 through the exhaust gas outlets 129.

That is, the stabilization region may extend parallelly to the axial direction of the driving wind connection passage 123 while having a uniform inner diameter, and thus may stabilize the flow of the driving wind introduced through the driving wind connection passage 123. The induction cover 121 may gradually decrease in inner diameter toward the rear side thereof, and thus may have a conical shape. Thus, the first induction region may accelerate the driving wind introduced through the driving wind connection passage 123. The second induction region may extend in an inner diameter of a size parallel to the outer circumferential surface of the exhaust gas passage pipe 122, and thus may allow the driving wind to flow at a uniform speed. Thus, a driving wind may be accelerated in the first induction region, the sectional area of which gradually decreases in the flow direction of the driving wind. The driving wind may be maintained at a uniform speed in the second induction region, the sectional area of which is uniformly maintained in the flow direction of the driving wind.

Meanwhile, the exhaust gas passage pipe 122 may communicate with the exhaust pipe 9 to allow an exhaust gas to pass through. Also, the plurality of exhaust gas outlets 129 disposed at different locations in an axial direction may be disposed to penetrate the outer circumferential surface of the exhaust gas passage pipe 122. A protrusion part may not be formed in the outer circumferential surface where the exhaust gas outlet 129 is formed, and an exhaust gas may be discharged through the exhaust gas outlet 129.

Here, the exhaust gas outlet 129 may serve as a passage through which an exhaust gas flowing in the exhaust gas passage pipe 122 may be suctioned into an air flow field having a lower pressure of the driving wind flowing at a high speed. Also, the outer circumferential surface of exhaust gas passage pipe 122 and the inner circumferential surface of the induction cover 121 at the second induction region including a first section I where the exhaust gas outlets 129 are formed may be formed to have a smooth surface, and thus an occurrence of swirl in a mixture flow of an exhaust gas and a driving wind may be minimized between the exhaust gas passage pipe 122 and the induction cover 121.

The end of the exhaust gas passage pipe 122 may be formed to align with the end of the second induction region of the induction cover 121.

As shown in FIG. 8, an exhaust passage pipe end 132 may be disposed at the rear side of the exhaust gas passage pipe 122. The exhaust passage pipe end 132 may have a conical shape that is sharp toward the exhaust gas passage pipe 122. Accordingly, since the rear end of the exhaust gas passage pipe 122 is blocked by the end 132, an exhaust gas flowing in the exhaust gas passage pipe 122 may be all discharged to the outside of the exhaust gas passage pipe 122 through the exhaust gas outlet 129.

Here, a guide plate 127 may be disposed at the rear end portion of the exhaust gas passage pipe 122. The guide plate 127 may curvedly incline with respect to the axial direction of the exhaust gas passage pipe 122. An exhaust gas flowing in the exhaust gas passage pipe 122 may be allowed to be discharged through the exhaust gas outlet 129 while an occurrence of a swirl is minimized. That is, a plurality of guide plates 127 may be spaced from the surface of the exhaust passage pipe end 132 by certain gaps, and may be spaced from each other by a certain gap.

Accordingly, exhaust gases adjacent to the center of the exhaust gas passage pipe 122 may be discharged through the exhaust gas outlets 129 located downstream of the flow direction of a driving wind along guide flow passages indicated as S1 and S2. On the other hand, exhaust gases away from the center of the exhaust gas passage pipe 122 in a radial direction may be discharged through the exhaust gas outlets 129 located upstream of the flow direction of the driving wind along guide flow passages indicated as S3 and S4. The guide plate 127 may guide exhaust gases such that all exhaust gases flowing in the exhaust gas passage pipe 122 are discharged through the exhaust gas outlets 129.

Here, the exhaust gas outlet 129 may be disposed in plurality along the axial direction of the exhaust gas passage pipe 122, and may be spaced from each other. The exhaust gas outlet 129 may be formed into a circular ring, rectangular ring shape according to the sectional shape of the exhaust gas passage pipe 122. Here, 'ring shape' may include a perfect ring shape, and may also include ring shapes that are not the perfect ring shape due to a connection member connecting a ring member in the axial direction. However, the exhaust gas outlet 129 may be opened as much as a circumferential angle of at least about 270 degrees, and the angle of opening may range from about 330 degrees to about 335 degrees.

Accordingly, an exhaust gas flowing in the exhaust gas passage pipe 122 may be evenly discharged to a space between the induction cover 121 and the exhaust gas passage pipe 122 through the outlet 129 without a deviation in a circumferential direction. The second induction region in which the exhaust gas outlets 129 are formed may maintain a uniform section between the exhaust gas passage pipe 122 and the induction cover 121, and the plurality of exhaust gas outlets 129 may be disposed at the first section I in second induction region. Accordingly, even though a swirl occurs in a driving wind, the swirl can be immediately stabilized, and then can be smoothly discharged.

In the drawing, four guide flow passages S1, S2, S3 and S4 are shown as being formed by the guide plates 127, but according to another embodiment, three or more guide flow passages may be formed. As shown in the drawing, the guide plate 127 may extend toward the upstream side of the sharp apex F located at the front end portion of the exhaust passage pipe end 132, thereby further stabilizing the flow in the guide flow passages S1, S2, S3 and S4. That is, a protrusion part that protrudes at the center may be formed on the exhaust passage pipe end 132 against the flow direction of an exhaust gas flowing in the exhaust gas passage pipe 122. Meanwhile, when the sharpness angle of the apex F of the exhaust passage pipe end 132 is equal to or less than about 20 degrees, the guide plate 127 may also extend just to the apex F, or may extend from a downstream side of the apex F.

Thus, the exhaust passage pipe end 132 may be further provided to block the exhaust gas passage pipe 122.

The sum of the sectional areas of four exhaust gas outlets 129 formed by the guide plate 127 may be equal to or larger than the radius of the exhaust gas passage pipe 122. That is, the sectional area of the guide flow passages S1, S2, S3 and S4 formed by the guide plates 127 may be uniformly maintained, or may gradually increase based on the flow direction of the flow passage. Thus, since the flow cross-sectional area is not narrowed until an exhaust gas flowing in the exhaust gas passage pipe 122 is discharged through the exhaust gas outlet 129, the generation of a swirl inside the guide flow passages S1, S2, S3 and S4 can be inhibited. The cross-section of the guide flow passages S1, S2, S3 and S4 may have such a form that an exhaust gas can flow from the inlet to the exhaust gas outlet 129 at a uniform flow rate.

The front end portion of the exhaust passage pipe end 132 may have a conical shape with a sharp apex F, and the angle of the inclination surface of the conical shape may be equal to or less than about 30 degrees. Thus, when an exhaust gas flowing in the exhaust gas passage pipe 122 collides with the exhaust passage pipe end 132, the flow resistance of the exhaust gas may be minimized by the contact with the apex F formed into an acute angle. Accordingly, an exhaust gas can be smoothly guided and discharged to the exhaust gas outlet 129 located at the distal end along the inclination surface 126 of the exhaust passage pipe end 132.

Thus, the end of the exhaust gas passage pipe 122 may be blocked by the exhaust passage pipe end 132, but the front end portion of the exhaust passage pipe end 132 may be sharp, and simultaneously, the outlet sectional areas Ao may be equal to or larger than the inlet sectional areas Ai of the guide flow passages S1, S2, S3 and S4, respectively. Accordingly, exhaust gases flowing in the exhaust gas passage pipe 122 may be all discharged out of the exhaust gas outlets 129 through the guide flow passages S1, S2, S3 and S4. Also, the cross-section of the guide flow passages S1, S2, S3 and S4 may be constant, or may gradually increase toward the outlet 129, and thus exhaust gases may be discharged out of the outlet 129 without an occurrence of a swirl while passing the guide flow passages S1, S2, S3 and S4. The exhaust gases discharged may be mixed with a driving wind accelerated, and may be discharged. Accordingly, the discharge efficiency of exhaust gases can be maximized.

Here, the gradual increasing of the cross-section may be implemented such that the outlet sectional area of the guide flow passages S1, S2, S3 and S4 does not exceed the inlet sectional area of the guide flow passages S1, S2, S3 and S4 by about 20%. When the outlet sectional area of the guide flow passages S1, S2, S3 and S4 is about 20% larger than the inlet sectional area of the guide flow passages S1, S2, S3 and S4, the flow rate of exhaust gases that are discharged through the outlet 129 along the guide flow passages S1, S2, S3 and S4 may be reduced, and thus the discharge efficiency may be reduced.

Accordingly, the first section I in which the plurality of exhaust gas outlets 129 are disposed may extend in a length that is equal to or larger than the inner diameter of the exhaust gas passage pipe 122.

Figure 9:
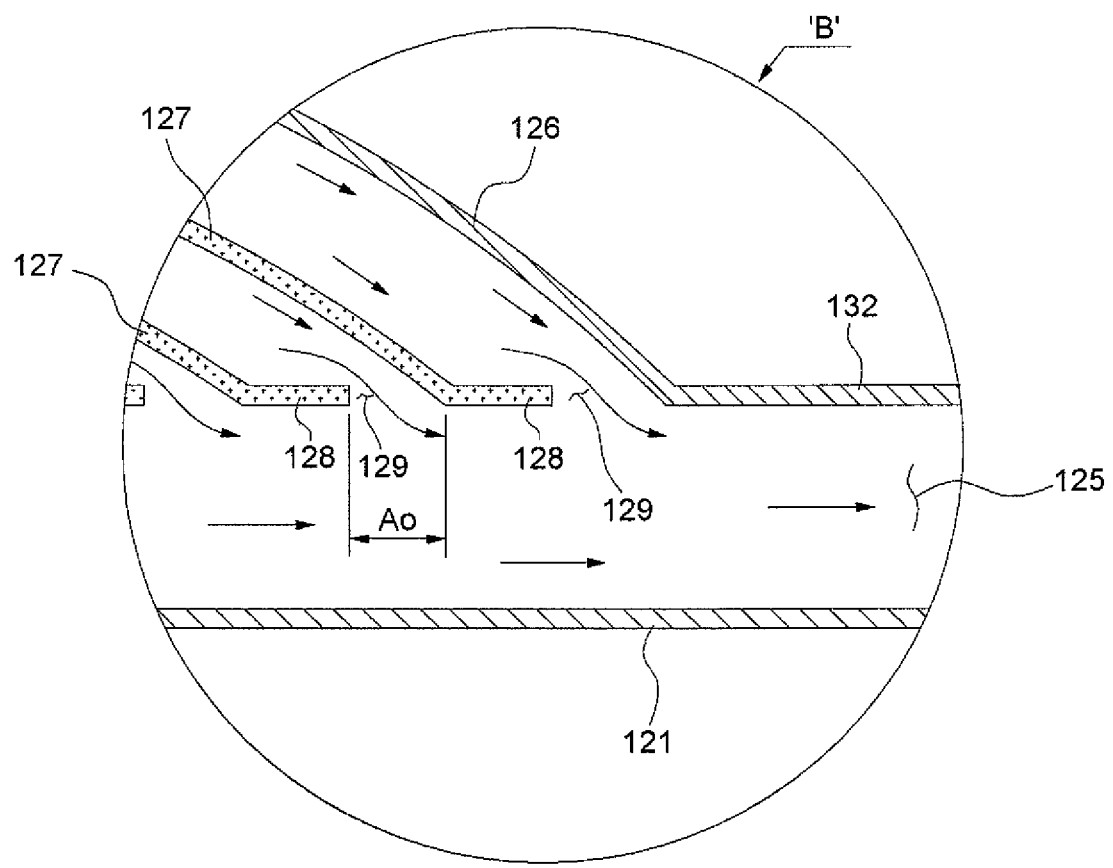
FIG. 9 is a magnified view illustrating a portion 'B' of FIG. 8.

As shown in FIGS. 8 and 9, an induction plate 128 may extend from the end of each guide plate 127 in the same direction as the axial direction of the exhaust gas passage pipe 122. The induction plate 128 may extend in a rear direction (direction of the mixture gas outlet 125). As shown in FIG. 9, the induction plate 128 may be formed on the end of the guide plate 127, and thus exhaust gases passing the exhaust gas guide passages S1, S2, S3 and S4 may be discharged out of the exhaust gas outlet 129 while being horizontally guided by the induction plate 128. The flow direction of exhaust gases flowing toward the mixture gas outlet 125 of the second induction region may form an acute angle less than 90 degrees with the flow direction of a driving wind, and may be smoothly mixed with the driving wind. Thus, exhaust gases may be discharged out of the mixture gas outlet 125 while being little affected by the flow resistance.

Here, when the induction plate 128 is formed at the exhaust gas outlet 129, the inner diameter of the exhaust gas passage pipe 122 may be equal to or about 20% less than the sum of the axial direction lengths of the exhaust gas outlet 129 which are not covered by the induction plate 128.

Thus, since the inner diameter of the exhaust gas outlet 129 is equal to or slightly smaller than the length of the exhaust gas outlet 129, the guide flow passages S1, S2, S3 and S4 formed by the guide plate 127 can reduce the back pressure while preventing a swirl when exhaust gases are discharged by a high-speed driving wind induced by the induction cover 121.

That is, the present invention can minimize the flow resistance and the occurrence of a swirl by dividedly guiding exhaust gases of different regions to different exhaust gas outlets 129 using the guide plate 127. Also, since the internal sectional area of the exhaust gas passage pipe 122 extends to the exhaust gas outlet 129 without a change, exhaust gases may be wholly discharged at one time without a blockage, and thus may be continuously discharged to the mixture gas outlet 125, thereby maximizing the discharge efficiency.

Meanwhile, the sectional area (sectional area of a diameter di) of the end of the exhaust gas passage pipe 122 may be larger about 1 to 1.5 times than the sectional area (area obtained by subtracting a sectional area of a diameter di from a sectional area of a diameter do) of the mixture gas outlet 125 of the second induction region. When the sectional area of the exhaust gas passage pipe 122 is smaller than the sectional area of the mixture gas outlet 125 of second induction region, the performance of suctioning an exhaust gas may be reduced due to the resistance of a flow passing the second induction region. When the sectional area of the exhaust gas passage pipe 122 is about 1.5 or more times larger than the sectional area of the mixture gas outlet 125 of second induction region, the flow velocity of a lower pressure field formed at the exhaust gas outlet 129 may become slow, and thus a force of suctioning an exhaust gas may be lowered. Accordingly, the sectional area of the exhaust gas passage pipe 122 may be formed to be about 1 to 1.5 times larger than the sectional area of the mixture gas outlet 125 of the second induction region.

Figure 10:
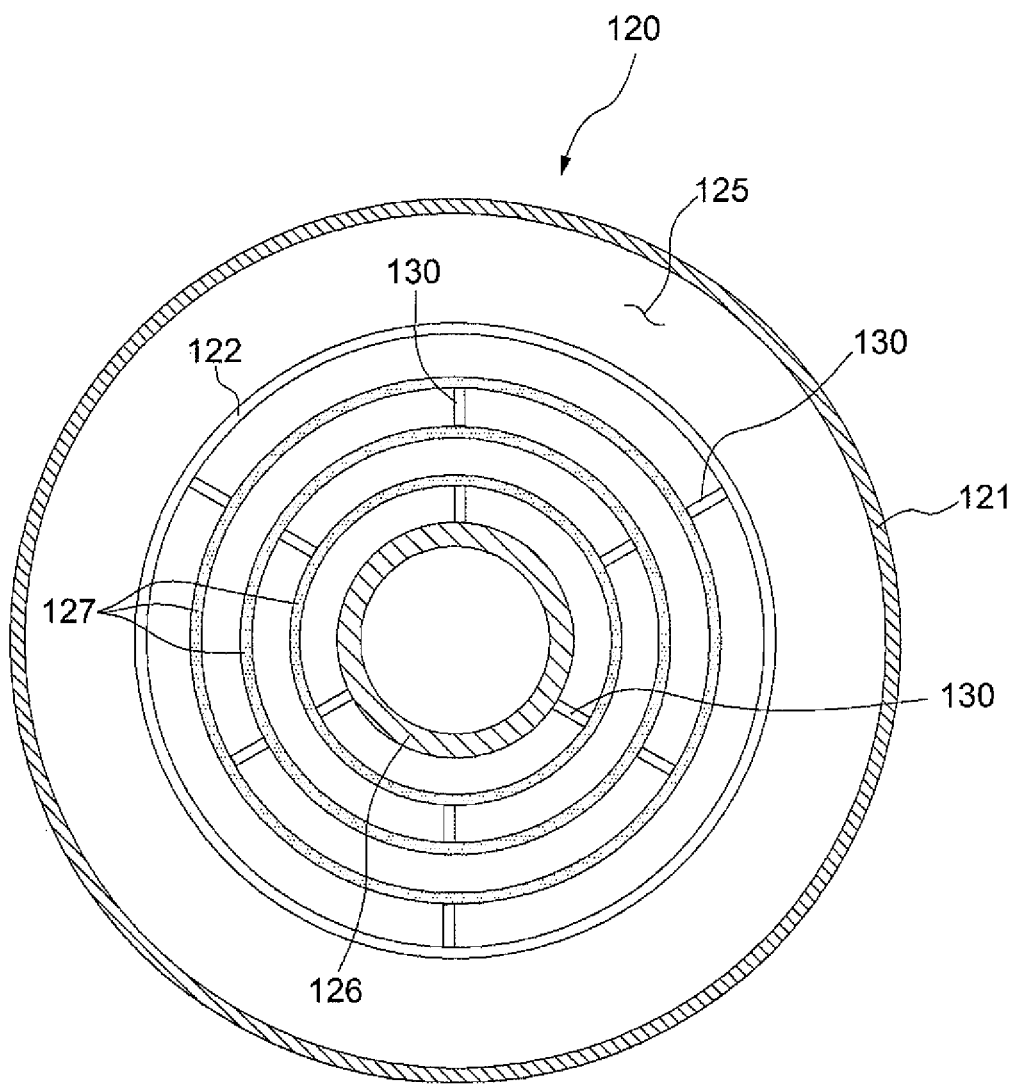
FIG. 10 is a cross-sectional view taken along a line A-A of FIG. 7.

As shown in FIG. 10, the guide plate 127 adjacent to the exhaust passage pipe end 132 may be fixed to the exhaust passage pipe end 132 by a support member 130, and the guide plate 127 located at the outside thereof may be fixed to the guide plate 127 adjacent to the inside thereof by the support member 130. In this case, the support member 130 may be formed at an interval of about 90 degrees to about 120 degrees. The exhaust passage pipe end 132 and the guide plates 127 may be coupled to each other by a coupling method such as welding, and thus may form one body on the whole.

Thus, an exhaust gas passing the exhaust gas passage pipe 122 may be guided to each region by the paths S1, S2, S3 and S4 formed by the plurality of guide plates 127, and then may be sequentially discharged out of the exhaust gas outlet 129. Accordingly, an exhaust gas flowing in the exhaust gas passage pipe 122 may be smoothly and quickly discharged through the exhaust gas outlet 129 at a higher flow rate per unit time while an occurrence of a swirl in the exhaust gas passage pipe 122 is maximally inhibited, and then may be mixed with a driving wind to be discharged to the outside.

Thus, although an exhaust gas is discharged through the plurality of exhaust gas outlets 129, the exhaust gas passing the exhaust gas passage pipe 122 can be discharged to the exhaust gas outlets 129 that are determined by location of the exhaust gas passage pipe 122 without a swirl. Accordingly, an exhaust gas discharged to a space between the induction cover 121 of the second induction region and the exhaust gas passage pipe 122 may be mixed with a driving wind introduced through the exhaust gas passage pipe 114 to form a mixture gas, and then the mixture gas may be discharged out of the mixture gas outlet 125. Thus, the discharge amount of exhaust gas per unit time can be maximized, and thus the discharge efficiency can be significantly improved.

Hereinafter, the operation principle of an exhaust gas discharge inducing apparatus 100 for a vehicle according to an embodiment of the present invention will be described in detail with reference to the accompanying drawings.

As shown in FIG. 4, when a vehicle runs, a large amount of driving wind may be introduced by the driving wind intake set 110 formed at a lower part of a vehicle, and may be supplied to the discharge inducing device 120 through the driving wind passage pipe 114. Thus, as shown in FIG. 8, a driving wind introduced through the driving wind passage pipe 114 may be supplied to the inside of the induction cover 121 through the driving wind connection passage 123 of the discharge inducing device 120.

A driving wind introduced to the inside of the induction cover 121 may be stabilized while passing the stabilization region, and may rapidly increase in flow velocity while passing the first induction region in which the inner diameter gradually decreases. Since the flow velocity of a driving wind passing the driving wind is faster than the flow velocity of an exhaust gas flowing in the exhaust gas passage pipe 122 connected to the vehicle exhaust pipe 9, a lower pressure field may be formed in the region of the exhaust gas outlet 129 by the principle of Bernoulli.

In this case, since the inner diameter of the induction cover and the outer diameter of the exhaust gas passage pipe 122 are uniformly maintained, the flow cross-section of a driving wind may be uniformly maintained. Accordingly, while a driving wind is passing the second induction region, the flow velocity may be uniformly maintained, and a pressure difference from the inside of the exhaust gas passage pipe 122 in which a higher pressure field is formed may be uniformly maintained.

At the same time, due to the plurality of guide plates 127 curvedly formed in the exhaust gas passage pipe 122 and the exhaust passage pipe end 132, an exhaust gas flowing in the exhaust gas passage pipe 122 may be smoothly guided and discharged out of the plurality of exhaust gas outlets 129 formed over a certain length. That is, due to the plurality of guide plates 127 curvedly formed, exhaust gases flowing at a location adjacent to the center of the exhaust gas passage pipe 122 may be discharged through the exhaust gas outlets 129 located downstream of the flow direction. On the other hand, exhaust gases flowing away from the center of the exhaust gas passage pipe 122 in a radial direction may be discharged through the exhaust gas outlets 129 located upstream of the flow direction.

That is, since an exhaust gas flowing in the exhaust gas passage pipe 122 is discharged at one stroke through the exhaust gas outlets 129 that are determined according to locations spaced from the center in a radial direction and thus an occurrence of a swirl inside is inhibited in the process of being discharged through the exhaust gas outlet 129, the flow rate of gases discharged per unit time may be maximized.

In this case, when the induction plate 128 is not formed or is formed into a negligible size, the cross-section of the exhaust gas outlet 129 may be formed equally to the radius of the exhaust gas passage pipe 122, and thus a possibility that a swirl occurs while an exhaust gas is being discharged from the exhaust gas passage pipe 122 to the exhaust gas outlet 129 can be ruled out.

Also, since an internal pressure difference between the exhaust gas passage pipe 122 and the region surrounded by the inner diameter of the induction cover 121 and the exhaust gas passage pipe 122 is uniformly maintained and thus a force of discharging an exhaust gas from the exhaust gas passage pipe 122 to the exhaust gas outlet 129 is uniform, a larger amount of exhaust gas may be suctioned and discharged to the outside of the exhaust gas outlet 129 without a swirl, and thus may be mixed with a driving wind to be discharged out of the mixture gas outlet 125.

In the embodiment configured as described above, when a vehicle runs, a driving wind of a fast flow velocity may be allowed to flow at the end portion of the exhaust pipe from which an exhaust gas is discharged, thereby forming a low pressure field around the exhaust pipe. Thus, an exhaust gas may be induced to be smoothly discharged, and thus the discharge efficiency of exhaust gas can be maximized. However, since a driving wind is little generated during the city driving or low-speed driving due to a traffic jam, there is a limitation in that the discharge effect of exhaust gas using the driving wind may be reduced.

Figure 11:
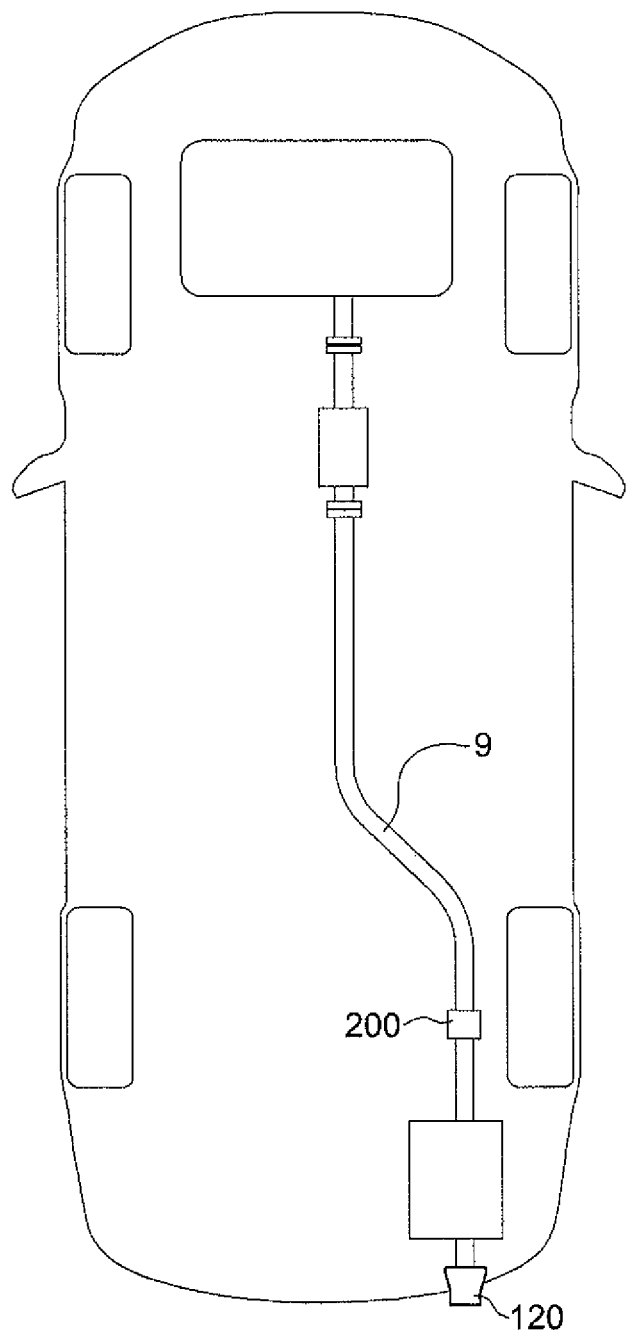
FIG. 11 is a view illustrating an installation state of an exhaust gas discharge inducing apparatus for a vehicle according to another embodiment of the present invention.
Figure 12:
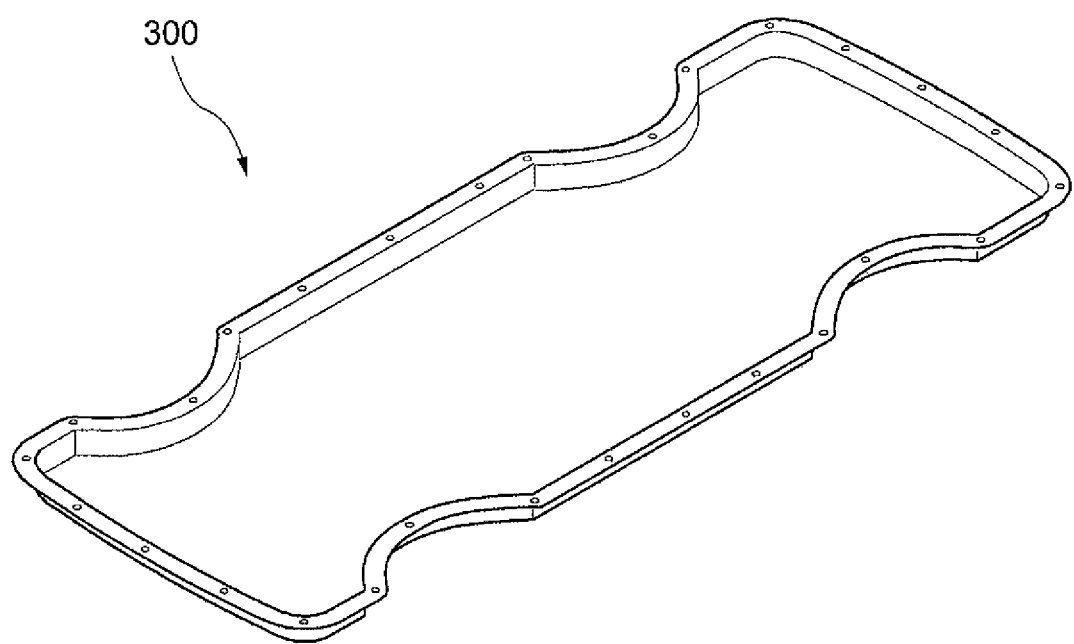
FIG. 12 is a perspective view illustrating a cover coupled to a lower part of a vehicle.

In order to overcome this limitation, as shown in FIG. 11 (driving wind intake set is omitted), an air pump 200 such as a cyclone motor which is driven by electricity may be installed at the exhaust pipe 9 between the muffler and the discharge inducing device 120. Thus, the air pump 200 may forcibly suction an exhaust gas with a pressure larger than the pressure of an exhaust gas discharged from the exhaust pipe 9, and may discharge an exhaust gas to the outside, thereby improving the output and fuel efficiency of a vehicle.

The air pump 200 may be configured to be turned on/off by a separate controller (not shown). Thus, when a vehicle runs at a high speed, an exhaust gas may be forcibly discharged by a driving wind while the operation of the air pump 200 stops, and when a vehicle runs at a low speed or jammed on a congested road, the air pump 200 may also be operated to forcibly discharge an exhaust gas. Thus, the high fuel efficiency can be achieved while preventing an unnecessary operation of the air pump 200.

Meanwhile, when an exhaust gas discharge inducing apparatus 100 for a vehicle according to an embodiment of the present invention is installed during the manufacturing process of a vehicle, there is no limit in installation. Also, even when a distance y from the muffler 4 to the rear end of the vehicle body is sufficiently long, it may be easy to install the exhaust gas discharge inducing apparatus 100 for a vehicle in an existing vehicle exhaust pipe 9.

Figure 14:
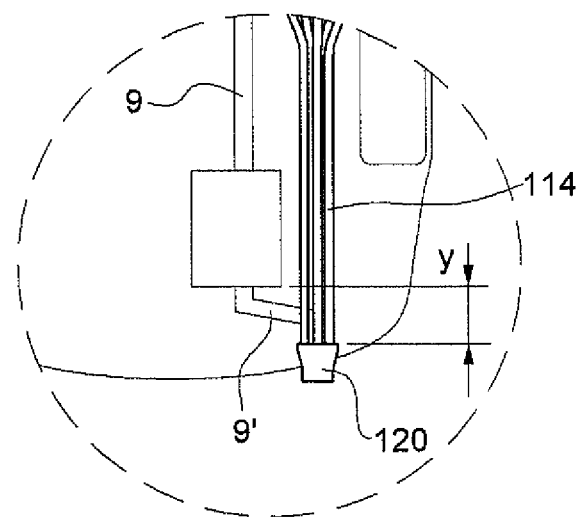
FIG. 14 is a view illustrating a modified example of an exhaust pipe extending from a muffler.

On the other hand, the distance y from the muffler 4 to the rear end of the vehicle body may be short, and the exhaust gas discharge inducing apparatus 100 for a vehicle may be installed after a vehicle is manufactured. In this case, as shown in FIG. 14, while a exhaust pipe 9' is bent and extended from the muffler in a lateral direction, the exhaust gas discharge inducing apparatus 100 may be connected, and the driving wind passage pipe 114 of the driving wind intake set 110 may be connected to an induction pipe connection member 123 of the exhaust gas discharge inducing apparatus 100. Thus, the installation of the exhaust gas discharge inducing apparatus 100 can be easily performed.

Driving Test

Test Scheme

A passenger vehicle and a 1-tone truck with full tanks cruised back and forth at the same speed on Jungbu Naeryuk Expressway in Korea. The fuel efficiencies of the presence and absence of the exhaust gas discharge inducing apparatus of the present invention were compared by measuring the fuel consumption and the traveling distance. The fuel efficiency reduction effect according to the installation of the discharge inducing device of the present invention is shown in Table 1.

TABLE 1

| Number of Vehicle | Model | Driving Section | Distance (km) | Installation of present invention | Consumed Fuel (l) | Fuel Efficiency (km/l) |
|---|---|---|---|---|---|---|
| 1 | Passenger vehicle (SONATA) | Yangpyung-North Sangju | 287 | non-installation | 20.080 | 14.292 |
|  |  |  | 287 | installation comparison of fuel efficiency | 18.305 | 15.678 9.967% improved |
| 2 | Passeger vehicle (SONATA) | Yangpyung-North Sangju | 287 | non-installation | 20.321 | 14.130 |
|  |  |  | 287 | installation comparison of fuel efficiency | 18.974 | 15.126 |
| 3 | 1-ton truck (PorterII) | Yangpyung-Sangju | 292 | non-installation | 29.036 | 10.056 |
|  |  |  | 292 | installation comparison of fuel efficiency | 25.991 | 11.235 11.715% improved |

In Table 1, two tests regarding passenger vehicles show that fuel efficiencies of vehicles equipped with the exhaust gas discharge inducing apparatus are improved by 9.967% and 8.382% compared to vehicles without exhaust gas discharge inducing apparatus of the present invention.

Also, one test regarding a 1-ton truck shows that fuel efficiency of a vehicle equipped with the exhaust gas discharge inducing apparatus is improved by 11.715% compared to a vehicle without exhaust gas discharge inducing apparatus of the present invention.

It is considered that a larger amount of driving wind was suctioned into the driving wind intake set due to a higher lower body of the 1-ton truck compared to a passenger vehicle.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

INDUSTRIAL APPLICABILITY

As described above, the present invention has been illustrated through preferred embodiments, but the present invention is not limited to a specific embodiment, and can be modified, changed, or improved into various forms within the technical spirit proposed in the present invention, specifically, within the scope described in claims.

In other words, although the exhaust pipe is illustrated as having a cross-section of a circular pipe shape in this embodiment, a rectangular or oval shaped cross-section may also be applied to the exhaust pipe of the exhaust gas discharge inducing apparatus. Also, when two exhaust pipes are disposed side by side, the induction cover may surround connection pipes that are connected to the two exhaust pipes, at once or respectively.

Having described the invention, the following is claimed:

1. A discharge inducing device comprising:

an exhaust gas passage pipe communicating with an exhaust pipe to allow an exhaust gas to pass therethrough, the exhaust gas passage pipe including a plurality of exhaust gas outlets formed at different locations in an axial direction and penetrating an outer circumferential surface of the exhaust gas passage pipe at a first section, allowing an protrusion part not to be formed on the outer circumferential surface where the exhaust gas outlets are formed, and discharging an exhaust gas through the exhaust gas outlets; and an induction cover including a first induction region surrounding the exhaust gas passage pipe to form a driving wind flow passage in which a driving wind induced in accordance with running of a vehicle between the exhaust gas passage pipe and the induction cover flows and accelerating a driving wind while gradually decreasing in cross-section along a flow direction of a driving wind, and a second induction region extending to an end thereof while maintaining a uniform cross-section and surrounding the exhaust gas outlets to promote a discharge of an exhaust gas from the exhaust gas passage pipe through the exhaust gas outlets;

an exhaust passage pipe end blocking the exhaust gas passage pipe while protruding at a center thereof against the flow direction of an exhaust gas flowing in the exhaust gas passage pipe;

a guide plate guiding all exhaust gases flowing in the exhaust gas passage pipe such that an exhaust gas discharged at a location adjacent to the center of the exhaust gas passage pipe is allowed to be discharged through an exhaust gas outlet adjacent to an end of the exhaust passage pipe end and an exhaust gas discharged at a location far away from the center of the exhaust gas passage pipe in a radial direction is allowed to be discharged through an exhaust gas outlet far away from the end of the exhaust passage pipe end.

2. The discharge inducing device of claim 1, wherein the exhaust passage pipe end protrudes in a sharp shape.

3. The discharge inducing device of claim 1, wherein guide flow passages guided by the guide plates are formed to have a uniform cross-section from an inlet to an outlet, respectively.

4. The discharge inducing device of claim 1, wherein the guide flow passages guided by the guide plates are formed to have a gradually increasing cross-section from the inlet to the outlet, respectively, and the sectional area of the outlet is larger than the sectional area of the inlet and smaller than about 120% of the sectional area of the inlet.

5. The discharge inducing device of claim 1, wherein in the second induction region, a cross-section between the exhaust gas passage pipe and the induction cover is uniformly maintained.

6. The discharge inducing device of claim 1, wherein the exhaust gas passage is formed into a ring shape, and is disposed in plurality while being spaced from each other along an axial direction.

7. The discharge inducing device of claim 1, wherein the first section is disposed within second induction region.

8. The discharge inducing device of claim 1, wherein the exhaust gas outlets are formed in three or more at different locations of an axial direction over the first section, and has a ring shape.

9. The discharge inducing device of claim 1, wherein the exhaust gas passage pipe is the exhaust pipe, or is coupled to the exhaust pipe.

10. The discharge inducing device of claim 1, wherein at least one of the exhaust gas outlets comprises an induction plate parallel to the exhaust gas passage pipe and extending toward the end of the exhaust gas passage pipe, to induce an exhaust gas flowing out of the exhaust gas passage pipe through the exhaust gas outlets to have a directional component parallel to the exhaust gas passage pipe.

11. The discharge inducing device of claim 1, wherein the sectional area of the exhaust gas passage pipe is about 1.0 to 1.5 times of the sectional area of a mixture gas outlet of the second induction region.

12. An exhaust gas discharge inducing apparatus installed at an exhaust pipe of a vehicle, the apparatus comprising:
a discharge inducing device including:
an exhaust gas passage pipe communicating with an exhaust pipe to allow an exhaust gas to pass therethrough, the exhaust gas passage pipe including a plurality of exhaust gas outlets formed at different locations in an axial direction and penetrating an outer circumferential surface of the exhaust gas passage pipe at a first section, allowing an protrusion part not to be formed on the outer circumferential surface where the exhaust gas outlets are formed, and discharging an exhaust gas through the exhaust gas outlets, and an induction cover including a first induction region surrounding the exhaust gas passage pipe to form a driving wind flow passage in which a driving wind induced in accordance with running of a vehicle between the exhaust gas passage pipe and the induction cover flows and accelerating a driving wind while gradually decreasing in cross-section along a flow direction of a driving wind, and a second induction region extending to an end thereof while maintaining a uniform cross-section and surrounding the exhaust gas outlets to promote a discharge of an exhaust gas from the exhaust gas passage pipe through the exhaust gas outlets; and two or more driving wind intake sets installed at a lower part of a vehicle to collect a driving wind generated during running of a vehicle and guiding the collected driving wind into an induction cover of the discharge inducing device mounted onto the end portion of an exhaust pipe through a driving wind passage pipe.

13. The exhaust gas discharge inducing apparatus of claim 12, wherein the driving wind intake set comprises:
a collection part disposed at an end portion of the driving wind passage pipe and having a wider sectional area than the sectional area of the driving wind passage pipe to collect a driving wind; and
a filter disposed at an inlet of the collection part and having a mesh shape to block foreign substances from being introduced into the driving wind passage pipe.

14. The exhaust gas discharge inducing apparatus of claim 12, wherein the collection part are disposed in plurality in a direction parallel to the ground.

15. The exhaust gas discharge inducing apparatus of claim 12, further comprising a driving wind guide disposed at a front side of the driving wind intake set under a vehicle and including a pair of plates spreading toward the front side.

16. The exhaust gas discharge inducing apparatus of claim 12, further comprising an undercover coupled to a lower part of a vehicle and having a flat undersurface, wherein the driving wind intake set is disposed in the undercover.

* * * * *